United States Patent [19]
Shibuya et al.

[11] Patent Number: 5,270,390
[45] Date of Patent: Dec. 14, 1993

[54] RESIN COMPOSITION AND HEAT SHRINKABLE FILM COMPRISING THE SAME COMPOSITION LAYER

[75] Inventors: Kunio Shibuya, Tsuchiura; Yoshihiro Matsukura, Niihari; Nobuyuki Hisazumi, Tsuchiura, all of Japan

[73] Assignee: Kureha Kagaku Kogyo Kabushiki Kaisha, Tokyo, Japan

[21] Appl. No.: 745,077

[22] Filed: Aug. 15, 1991

[30] Foreign Application Priority Data

Aug. 22, 1990 [JP] Japan .................................. 2-220391

[51] Int. Cl.$^5$ ............................................ C08L 67/02
[52] U.S. Cl. ...................................... 525/173; 525/92; 525/165; 525/174; 525/933; 428/910
[58] Field of Search .................. 525/173, 165, 933, 92

[56] References Cited

U.S. PATENT DOCUMENTS

| | | |
|---|---|---|
| 3,741,253 | 6/1973 | Brax et al. . |
| 4,070,417 | 1/1978 | Isaka .................................... 525/444 |
| 4,107,362 | 8/1978 | Valyi . |
| 4,547,433 | 10/1985 | Ohya et al. .......................... 428/516 |
| 4,725,651 | 2/1988 | Ranck ................... 525/173 |
| 5,035,955 | 7/1991 | Matsukura et al. ................. 428/520 |

FOREIGN PATENT DOCUMENTS

| | | |
|---|---|---|
| 3207742A1 | 9/1983 | Fed. Rep. of Germany . |
| 2371348 | 6/1978 | France . |
| WO86/02483 | 4/1986 | World Int. Prop. O. . |

*Primary Examiner*—Patricia A. Short
*Attorney, Agent, or Firm*—Nixon & Vanderhye

[57] ABSTRACT

The present invention discloses a resin composition containing 26~70 weight % of thermoplastic polyester resin, 10~30 weight % of polyester elastomer, and 20~44 weight % of vinylidene chloride resin and a biaxially stretched heat shrinkable film having cold resistance and oxygen gas barrier property comprising said resin composition, and further a biaxially stretched heat shrinkable laminated film having not only oxygen gas barrier property and cold resistance, but also melt hole resistance, heat resistance sealing property, and transparency after the shrinkage and comprising barrier layer of said resin composition, outer layer (polyamide or crosslinkable polyolefin), inner layer (crosslinkable polyolefin), and heat sealable layer (low crosslinkable polyolefin), at least the outer layer, the inner layer and the heat sealing layer being crosslinked by electron beam irradiation.

2 Claims, No Drawings

RESIN COMPOSITION AND HEAT SHRINKABLE FILM COMPRISING THE SAME COMPOSITION LAYER

BACKGROUND OF THE INVENTION

This invention relates to a resin composition comprising a thermoplastic polyester resin, a polyester elastomer, and vinilidene chloride resin (hereinafter called as "PVDC"), and a biaxially stretched heat shrinkable film including at least one layer thereof.

In general, shrink packaging is the most convenient form for uneven and irregular food products on their shapes, like raw meat or processed meat. As these food packaging needs a long preservation period, it is not only requested the superior oxygen gas barrier property [below 200 cc/m$^2$·day·atm. at 30° C., under 100% RH], but also the superior cold resistance.

PVDC film is widely used with its superior properties on oxygen gas barrier property, oil resistance, and clipping property besides the shrinkability. However, ordinary PVDC film shows sometimes insufficient strength, especially, the strength under low temperature (cold resistance) under severe packaging conditions while packaging heavy materials, so it is desired to get the packaging materials without these defects.

Resin composition containing PVDC and polyester copolymer resin derived from terephthalic acid and ethylene glycol and cyclohexane dimethanol are disclosed in U.S. Pat. No. 4,725,651 and it is shown that the moldings gained, have superior oxygen gas barrier property and mechanical strength.

However, the film made by the blended resin composition comprising PVDC and polyester, can not satisfy yet on the point of its cold resistance. Some attempts, therefore, are carried out to get the heat shrinkable films having good oxygen gas barrier property and cold resistance with laminating PVDC barrier layer and other resin layers, for example, three-layers film are provided to improve the cold resistance with co-extruding to prepare three-layer product having intermediate PVDC layer containing extremely small amount of the additives like plasticizers and stabilizers or without any these additives, and two outer layers of ethylene-vinylacetate copolymer (EVA) having adhesive property onto PVDC and the excellent cold resistance, these outer layers being provided on both sides of the PVDC layer (Canadian patent No. 982923).

On the other hand, heat shrinkable laminated film which does include one PVDC layer and has not only oxygen gas barrier property and excellent cold resistance, but also high performance with melt hole resistance, heat-resistant sealing property (the heat resistance of a seal portion), and transparency after shrinking, is also required, especially for the packaging on fatty foods like processed meat and cheese. The packaging and sterilization of fatty foods often involves problems in that a film softened by oil and heat may be stretched to become thin and thus break (melt hole) and in that a sealed part or parts in the vicinity thereof may be broken owing to heat shrinkage stress during sterilization. Concerned industry, therefore desires eagerly the heat shrinkable film which has not only oxygen gas barrier property, but also melt hole resistance, heat resistance sealing property, sufficient cold resistance without occurring pinhole during low temperature distribution, and superior transparency after shrinking. As these heat shrinkable laminated films, laminates cross-linked by electron beam are used, for example, flexible laminate suitable for the heat shrinkable packaging contains (1) the first layer containing organic polymer, (2) the oxygen gas barrier layer based upon PVDC, having oxygen gas transmission rate of lower than 70 cc/m$^2$·day·atm., in oxygen gas transmission rate of the laminated film (following ASTM Standard D1434, at 22.8° C. and 0% in RH), (3) the layer containing organic polymer having endurance for abusing. And this three layer laminated film described above are known in U.S. Pat. No. 3,741,253 with following embodiment, in which a laminate is characterized by the first layer containing an oriented copolymer of ethylene and vinylacetate having 5~20% units in weight, derived from vinylacetate, and crosslinked said copolymer by the irradiation, the oxygen gas barrier layer (2) containing 70~85% units in weight, derived from vinylidene chloride and 30~15% units in weight, derived from vinyl chloride, and the layer (3) consisting of (i) copolymer of ethylene and vinylacetate including 5~20% units in weight derived from vinylacetate, (ii) polymer blend of isotactic polypropylene, atactic polypropylene, and polybutene-1. Also, there are some technology in this field, in which U.S. Pat. No. 4,699,846 dlscloses the improvement on peeling off resistance among layers on laminated film having (1) base film layer containing α-mono olefin polymer irradiated and crosslinked, (2) film layer containing polymer being crosslinked by the irradiation, and then whole layer (1) and (2) being irradiated to produce further crosslinking and stretched the laminated film to attain the object described above, Japanese Patent Application Laid Open No. 3948/1987 discloses the heat shrinkable biaxially stretched multilayer film being suitable for packaging on slices of primal and subprimal meat and processed meat with the multilayer film containing vinylidene chloride-methylmethacrylate copolymer as oxygen gas barrier layer and irradiated with 1~5 Mega rad dose level, and Japanese Patent Application Laid-Open No. 23752/1987 discloses molecular oriented multilayer polymer film having the first layer and the second layer consisting of mainly ethylene vinylacetate copolymer and the layer of PVDC composition disposed between the first and the second layers and each composition being irradiated by electron beam over 1.5 Mega rad to attain crosslinking bonding. However, when the resin composition in U.S. Pat. No. 4,725,651 is used as a single layer of heat shrinkable film having oxygen gas barrier property and cold resistance, it has some defects which are inferior pin-hole resistance at low temperature adopted in food distribution step, because of high glass transition temperature on polyester copolymer and have low productivity derived from violent degradation of the resin at extrusion molding. As the heat shrinkable laminated film which request high performance, for example, EVA/PVDC/EVA composition shows superior laminated film having heat sealable, cold resistance, and good oxygen gas barrier property and compensates the defects on PVDC single layer product, but it shows poor melt hole resistance and heat sealing resistance. Further, the stretching is done at the temperature not over 40° lower than its crystal melting point of said polyolefin, to give shrinkability to a pair of polyolefin layer existing both side onto PVDC layer, so PVDC layer is not given enough stretching and orienting effect. Therefore, the heat shrinkability of PVDC layer is deficient, and when the laminate is heat shrinked, PVDC layer would be left behind in the shrinking behavior, and become to fine wrinkles after shrinking. In the result, the laminate film has a tendency to cause extremely poor transparency after shrinking. It is strongly desired, therefore, in the food packaging field, to provide the heat shrinkable laminated film with still excellent transparency after shrinking, having not only oxygen gas barrier property and excellent cold resistance, but also excellent melt hole resistance and heat resistance sealing property. Inventors have found out that the heat shrinkable film satisfied all requests described above is provided with using the resin composition comprising 26~70 weight % of thermoplastic polyester resin, 10~30 weight % of polyester elastomer, and 20~44 weight % of PVDC as the composition of the film having oxygen gas barrier property and cold resistance and attained this invention based upon this knowledge.

SUMMARY OF THIS INVENTION

The object of this invention is to provide the resin composition comprising 26~70 weight % of thermoplastic polyester resin, 10~30 weight % of polyester elastomer, and 20~44 weight % of PVDC.

Also, the object of this invention is to provide a biaxially stretched heat shrinkable film having superior oxygen gas barrier property and cold resistance comprising said resin composition.

Further the object of the present invention is to provide a biaxially stretched heat shrinkable laminated film having heat shrinkage percentage of over 15% at 90° C. and oxygen gas barrier property, and having intermediate layer being oxygen gas barrier layer of said resin composition, an outer layer of polyamide or crosslinkable polyolefin, an inner layer of the same crosslinkable polyolefin used in the outer layer or different polyolefin and a heat sealing layer of a low crosslinkable polyolefin, at least the outer layer, the inner layer and the heat sealing layer being crosslinked by electron beam irradiation. Moreover, the laminated film has not only oxygen gas barrier property and excellent cold resistance, but also excellent melt hole resistance, heat sealing resistance and superior transparency after shrinking.

DETAILED DESCRIPTION OF THE INVENTION

The resin composition in this invention comprises 26~70 weight %, preferably 36~65 weight % of thermoplastic polyester resin, 10~30 weight %, preferably 10~20 weight % of polyester elastomer, and 20~44 weight %, preferably 25~44 weight %, of PVDC.

Relating to the thermoplastic polyester resin, terephthalic acid, isophthalic acid, orthophthalic acid, adipic acid, sebacic acid, fumaric acid, maleic acid, trimeritic acid, succinic acid, benzene dicarboxylic acid, dodecan dicarboxylic acid, naphthalene dicarboxylic acid, diphenyl dicarboxylic acid, 2,2-bis(4-carboxyphenyl)propane, bis(4-carboxyphenyl)methane, and cyclohexane dicarboxylic acid are used as dibasic acid components and dialkyl esters derived from these acids (with alkyl group having 1 to 4 carbon atoms) are also used for this purpose.

And straight chain dialcohol compounds are favorable as dialcohol components, for example, ethylene glycol, propylene glycol, butylene glycol, neopentyl glycol, hexane diol, cyclohexane diol, diethylene glycol, triethylene glycol, tetraethylene glycol, and polyethylene glycol can be used for this purpose. The polyester resin derived from a mixture of terephthalic acid and isophthalic acid as dibasic acid and alcohols described above as alcohol component, and having 0.5~0.7 dl/gr in its intrinsic viscosity (Iv value), with 0.5 gr/100 ml trifluoroacetic acid solution at 30° C., is used favorably among these polyester resins. And favorable ratio on the mixture of terephthalic acid and isophthalic acid is 55~90 mol % of terephthalic acid and 45~10 mol % of isophthalic acid.

Further, favorable polyester resin is derived from terephthalic acid and isophthalic acid as mixed dibasic acid and ethylene glycol and diethylene glycol as mixed dialcohol component with the ratio of 60~98 mol % of ethylene glycol and 2~40 mol % of diethylene glycol. Favorable polyester resin used in this invention should not be compatible with PVDC each other and preferable example is Kanebo Corporation's product, "PIFG-40" which is a copolymer resin of terephthalic acid-isophthalic acid-ethylene glycol-diethylene glycol, having 68° C. of its glass transition temperature. If the content of polyester resin exceeds 70 weight %, the ratio of polyester elastomer becomes small value which makes insufficient cold resistance and if the content of polyester resin is below 21 weight %, polyester resin component can not be matrix. As polyester elastomer, polyester-polyether copolymer which is derived from followings as main component, is preferably used:
(i) dicarboxylic acid,
(ii) lower glycol,
(iii) higher glycol.

The component, (i) is selected from the aromatic dicarboxylic acids including terephthalic acid, isophthalic acid, phthalic acid, p-oxybenzoic acid, m-oxybezoic acid, naphthalene dicarboxylic acid etc. and among the aliphatic dicarboxylic acids and alicyclic dicarboxylic acids including oxalic acid, adipic acid, succinic acid, sebacic acid, 1,4-cyclohexane dicarboxylic acid, 1,3-cyclohexane dicarboxylic acid etc. The component, (ii) is selected from such aromatic, aliphatic and alicyclic glycols as 1,4-butanediol, ethylene glycol, propylene glycol, hexamethylene glycol, neopentyl glycol, p-xylylene glycol, cyclohexane glycol, alicyclic glycol etc. The component, (iii) is selected from polyethylene glycol, polypropylene glycol, polytetramethylene glycol, copolymer of these glycol etc., preferably the compounds having 8~20 carbon atoms as the ethylene segments.

Favorable example of polyester elastomer used in this invention is a copolymer resin derived from terephthalic acid-isophthalic acid-1,4-butanediol-polytetramethylene glycol [for example, Toray.Dupont's product, "HYTREL" #2501].

Though polyester elastomer has a role to add flexibility to the 3 component mixed resin, it can not give desirable cold resistance below 10 weight % content and is unfavorable to arise poor optical transparency and poor oxygen gas barrier property over 30 weight % content. A weight-average molecular weight of the polyester elastomer used in this invention is preferably about $0.5 \times 10^4 \sim 3 \times 10^4$, more preferably $0.8 \times 10^4 \sim 2.5 \times 10^4$.

As these polyester elastomers are added with their suitable amounts, the mixture of PVDC, polyester resin, and polyester elastomer can improve surprisingly the cold resistance without injuring the transparency.

The PVDC is preferably a copolymer composed of vinylidene chloride as a main component and a monomer which is copolymerizable with vinylidene chloride and especially, it is favorable to be 65~95 weight % in vinylidene chloride content. If the content of vinylidene chloride is below 65 weight %, it is not suitable for practical use, because of extreme deterioration on oxygen gas barrier property with becoming rubber like material at ordinary temperature and losing its crystal structure. And over 95 weight % in vinylidene chloride content, stable melt extrusion processing becomes difficult, because raising the melting point lead easily to its decomposition.

Concerning the monomer being copolymerizable with vinylidene chloride monomer, one or more than 2 kind unsaturated monomers are selected from following monomers: vinyl chloride, acrylonitrile, acrylic acid, methacrylic acid, alkylacrylate having 1~18 carbon atoms in alkyl group, alkylmethacrylate having 1~18 carbon atoms in alkyl group, maleic anhydride, maleic acid, alkylmaleate, itaconic acid, alkylitaconate, vinyl acetate, ethylene, propylene, isobutylene, butadiene, etc.

It is possible to add plasticizer and stabilizer into PVDC, if they are necessary. Each 0.1~3 weight % of plasticizer and stabilizer respectively, are favorable to add into PVDC and the amount below 0.1 weight % does not show their effects. Also, the amount over 3 weight %, injure the oxygen gas barrier property and can not attain the purpose of present invention.

Concerning stabilizer, specifically, epoxy type stabilizer is favorable, though heat stabilizer in the market can be used.

Following epoxy type stabilizers are illustrated for this purpose: epoxidized vegetable oil derived from soybean oil, saflower oil, sunflower oil, linseed oil, cotton seed oil etc. and epoxidized fatty oil monoester represented by epoxidized octyl stearate, epoxidized fatty acid diester obtained by epoxidation to glycolester of unsaturated fatty acid, alicyclic epoxide represented by epoxy hexahydro phthalic acid diester etc.

The resin composition comprising polyester, polyester elastomer, and PVDC which is described above, are processed with melt extrusion using extruder under ordinary method, and biaxially stretched with inflation, or biaxially stretched after press molding, T-die oxygen gas barrier property and cold resistance is formed. It is desirable that the product has heat shrinking percentage of over 20% at 90° C. Also, it is desirable that when the resin composition is used as the single layer film its thickness is preferably 8~100 μm, more preferably 10~60 μm.

In this invention, the film is stretched in the stretching ratio of over 2 times in the direction of length and breadth respectively by the ordinary biaxial stretching method, and so PVDC particles are stretched and dispersed in the matrix of polyester resin and polyester elastomer to long and slender particles and form a lot of flat layer in parallel with stretching direction (microlayer state). Accordingly, its oxygen gas barrier property is superior to non-stretching film.

If the content of PVDC is below 20 weight %, the film shows poor oxygen gas barrier property, and over 44 weight %, the film shows unfavorable colouring caused by degradation followed electron beam irradiation.

Also, in the blending of PVDC and only polyester elastomer which has compatibility with PVDC, as microlayer condition is not attained, improvement on oxygen gas barrier property is not attained during biaxial stretching process.

The resin composition in this invention can be used as oxygen gas barrier layer in biaxially stretched heat The resin composition in this invention can be used as oxygen gas barrier layer in biaxially stretched heat shrinkable laminated film. Related to the heat shrinkable laminated film, the favorable product is that the product comprises intermediate barrier layer prepared by the resin composition in this invention, outer layer from polyamide or polyolefin with crosslinking property, inner layer from polyolefin with crosslinking property made by the same or different material from the said outer layer, and heat sealing layer made by polyolefin with low crosslinking property. And moreover, the favorable product should be the one which at least the outer layer, inner layer, and heat sealing layer are crosslinked by the electron beam irradiation and has over 15% of its heat shrinkage percentage at 90° C.

Concerning polyamide resin used as the outer layer, the product having its melting point below 210° C., preferably below 180° C., is used for this purpose. The crystalline melting point of this polyamide is determined based upon the method of ASTM-D648. At least, one polyamide selected from aliphatic polyamides (4~12 in carbon atoms), alicyclic polyamides, and aromatic polyamides is preferably used. Followings are favorable monomers to constitute the polyamides, so the polymers and copolymers formed from these monomers are used for this purpose, for example, straight chain ω-amino craboxylic acid having 6~12 in its carbon atoms and its lactum, adipic acid, sebacic acid, dodecan dicarboxylic acid, heptadecan dicarboxylic acid, hexamethylene diamine, isophthalic acid, bis-(4-aminocyclohexyl)-methane, 2,2-bis-(4'-aminocyclohexyl)-propane, terephthalic acid and its dimethyl ester, 1,6-diamino-2,2,4-trimethylhexane, 1-amino-3-aminomethyl-3,5,5-trimethyl-cyclohexane etc. The most suitable materials among these polyamide or copolyamide are nylon 6-66, nylon 6-69, nylon 6-11, nylon 12, nylon 6-12, nylon 6-66 -610, nylon 6-66-

The polyamide resin having over 210° C. in its crystalline melting point, requires higher processing temperature during melting extrusion of the laminate, so it brings difficulty about processing because PVDC is apt to decompose in processing temperature.

Relating to polyolefin having crosslinking property and used for outer or inner layer, one material used for this purpose is at least one polyolefin selected from following components: ethylene-vinylacetate copolymer (EVA, preferably, 5~20 weight % in vinylacetate content), ethylene-(meth)acrylic acid copolymer [Preferably, 5~20 weight % in (meth)acrylic acid content], ethylene-(meth)acrylate copolymer [preferably, 5~20 weight % in (meth)acrylate content], ethylene-(meth)acrylic acid allyl copolymer [0.005~2 mol %, preferably 0.01~1.0 mol % in (meth)acrylic acid allyl content], ethylene-vinylacetate-(meth)acrylic acid allyl copolymer resin [5~20 weight % in vinylacetate content and 0.005~2 mol %, preferably 0.01~1.0 mol % in (meth)acrylic allyl acid content], ethylene-α-olefin-(meth)acrylic allyl acid copolymer resin (propylene, butene-1, pentene-1, hexene-1, 4-methylpentene-1, octene-1, decene-1 etc. and the mixture of these are used as α-olefin), ethylene-1,4-diene copolymer resin, ethylene-propylene-1,4-diene copolymer resin, linear low density polyethylene by gas phase polymerization, ionomer resin etc. In these descriptions, (meth)acrylic acid designates acrylic acid or methacrylic acid.

As polyolefin with low crosslinking property for heat sealing layer in the most inner layer (the side contacting to the content packed), the suitable material, one or some mixtures, are selected from the followings: linear low density polyethylene (LLDPE) by solution polymerization method, ethylene-propylene copolymer resin, propylene-butene copolymer resin, low density polyethylene etc. Polyolefin having low crosslinking property means that the polyolefin shows comparatively difficulty to be crosslinked under the same level of electron beam irradiation, compared with said crosslinkable polyolefin. By the use of these polyolefins, application range on heat sealability is widened by this irradiation and the seal strength is improved greatly compared with non-irradiated one, and on the other hand, heat sealability is not decreased by the excess crosslinking.

As adhesives used in adhesive layer, followings are illustrated: α-olefin polymer derivatives, for example, graft polymer and its salt produced by graft polymerizing polyethylene or polypropylene with unsaturated carboxylic acid or its anhydride, α-olefin-vinylacetate copolymer or its derivatives and α-olefin-unsaturated carboxylic acid copolymer or its derivatives, for example, ethylene-(meth)acrylic acid copolymer, ethylene-(meth)acrylic acid alkyl ester copolymer and graft polymer and its salt produced by graft polymerizing any of these polymer with unsaturated carboxylic acid or its anhydride. As unsaturated carboxylic acid or its anhydride used for graft polymerization, acrylic acid, methacrylic acid, maleic acid, maleic anhydride etc. are used and favorable amount is 0.01~5 weight % to original polymers to be grafted. As especially favorable adhesive polymer, followings are illustrated: the graft polymers produced by graft polymerizing ethylene ethylacrylate copolymer (EEA) having 5~25 weight % in its ethylacrylate content or ethylene-vinylacetate copolymer having 5~25 weight % in its vinylacetate content with 0.05~0.5 weight % maleic anhydride.

These adhesive layer can be crosslinked by electron beam irradiation to make strong adhesion onto adjacent layer.

The expression "being crosslinked" made in this invention, means that the gel% value, an indication as the degree of crosslinking and being explained in later, is over 5%. The range of favorable gel% is 20~80%, preferably 30~80%, in both outer and inner layers. The value below 20% has poor improvemental result on melt hole resistance. Also, the favorable value is 10~40%, more preferably in the range 10~30% in heat sealing layer. The desirable value of heat sealing layer is below 40%, because too higher crosslinking degree produce poor sealing strength.

The dose level of electron beam irradiation is 1~12 Mega rad, preferably in the range of 1~10 Mega rad. Irradiation dose level below 1 Mega rad shows too small crosslinking, so it can not obtain the effect of crosslinking. And the irradiation dose level over 12 Mega rad is unfavorable because it arises coloring of laminated film and lowering of sealing strength caused by excess crosslinking in heat sealing layer.

Referring to laminated film in this invention, favorable thickness is 5~30 μm in outer and inner layer. Outer layer over 30 μm is unfavorable to cause unstable film production derived from too large stress during stretching.

Favorable thickness is 5~20 μm for oxygen gas barrier layer and the value below 5 μm is not desirable because of insufficient oxygen gas barrier effect.

Favorable thickness is 5~30 μm for the most inner layer, that is, heat sealing layer. Desirable thickness is 1~5 μm for adhesive layer.

Favorable thickness is 25~125 μm on total laminated film. The layer construction in the laminated film in this invention, can be shown outer layer/intermediate layer/inner layer/heat sealing layer or outer layer/inner layer/intermediate layer/heat sealing layer and, if it is necessary, adhesive layer can be placed between each layers or on both sides of intermediate layer.

The content packed contacts to the heat sealing layer which is the most inner layer, the outer layer corresponds to another most outer layer, and both intermediate and inner layers are existed between outer layer and heat sealing layer.

These laminated films become heat shrinkable film having over 15% in their heat shrinkage percentage at 90° C., by biaxial stretching process. The field of said laminated film being effectively used, is to package uneven and irregular fatty foods like raw red meat, processed meat, and cheese, and the heat shrinkage percent below 15% at 90° C., of used film is unfavorable to lower extremely commodity value because of the lack of tight contact to the content packed and the occurrence of separation of meat juice. Concerning oxygen barrier property on this packaging, necessary oxygen gas transmission rate is below 200 cc/m$^2$·day atm, preferably below 100 cc/m$^2$·day·atm. The oxygen gas transmission rate over 200 cc/m$^2$·day·atm is unfavorable to shorten the preservation period on the content and lose good commodity appearance.

Following is one of examples to manufacture biaxially stretched heat shrinkable laminated film in this invention. The mixture blended PVDC powder, polyester elastomer, and polyester resin pellet with prescribed ratio as oxygen gas barrier layer (intermediate layer), crosslinkable polyolefin resin used as outer and inner layer, and low crosslinkable polyolefin resin as heat sealing layer, are melted with adhesive resin, if necessary, respectively using plurality of extruders under ordinary process, then introduced into circular die to form laminate and laminated in the order of outer layer/adhesive layer/oxygen gas barrier layer/adhesive layer/inner layer/heat sealing layer by coextrusion. After the melt tubular film obtained is then quenched by a cooling water shower at 10°~20° C., a flat tubular film is formed. The thus obtained tubular film is introduced into electron beam irradiation equipment, irradiated whole laminate layers with 1~12 Mega rad in its dose level, and then the over 2.5 times stretching was done in both direction of length and breadth respectively with inflation method at 50°~120° C. under simultaneous biaxial stretching. In this case, it is desirable to equally irradiate from the both surface of the flat tubular film so as to get homogeneous irradiation dose on the whole flat film thickness of flat tubular film.

The electron beam used in this invention, is a beam having 150~1000 KeV energy emitted from various electron accelerators including Cockroft-Walton's type, Van de Graaf type, Resonance transformer type, Insulation core transformer type, Linear accelerator type, Dynamitron type, High frequency cyclotron type etc.

Resin composition in this invention are mixture of PVDC, thermoplastic polyester resin, and polyester elastomer with specified ratio and show excellent oxygen gas barrier property, cold resistance and transparency, when these resin compositions are used for heat shrinkable film. Namely, as the suitable amount of polyester elastomer is added, it does not harm the transparency and can improve the cold resistance. And PVDC in blend resin into oxygen gas barrier layer, is lowered below 44 weight % in its weight ratio, and said oxygen gas barrier layer is stretched, so PVDC particle is dispersed to microlayer state of long and slender shape and can improve the oxygen gas barrier property, moreover it has an advantage of no-colouring without decomposition even under the irradiation of electron beam.

Biaxially stretched heat shrinkable laminated film which contains the layer comprising this resin compositions as oxygen gas barrier layer, is irradiated by electron beam, and at least outer layer, inner layer, and heat sealing layer were crosslinked, so further following effects are added to the effects described above.

(1) Oxygen gas barrier layer can be protected from abuse.
(2) Heat resistance of said laminated film can be improved surprisingly for improvement on heat resistance of polyolefin layer affected by electron beam irradiation.
(3) As low crosslinkable polyolefin resin is used in heat sealing layer, the range of suitable heat sealing temperature is wide and sealing strength is greatly improved compared with on-irradiation film by electron beam.
(4) When adhesive layers are provided, the adhesive layers are also crosslinked, so turbidity which is caused by sliding among each layers even if the film is boiled at the temperature near boiling water can be prevented and film transparency is kept after boiling.

As these results, we have obtained heat shrinkable laminated film which keeps favorable oxygen gas transmission rate below 200 cc/m²·day·atm, melt hole property [damaged number 0 among 5 samples], haze below 8%, and seal strength over 1.8 kg/15 mm.

This invention is explained concretely using examples in following description but not restricted by these examples.

EXAMPLE 1

As resin composition the following resin composition A is used. The blended resin, A consists of 30 weight % of polyester resin having 68° C. in its glass transition temperature and identified terephthalic acid-isophthalic acid-ethylene glycol-diethylene glycol copolymer resin (Iv=0.52, PIFG-40 manufactured by Kanebo, Ltd.), 30 weight % of polyester elastomer identified terephthalic acid-isophthalic acid-1,4,-butandiol-polytetramethyleneglycol copolymer resin (HYTREL #2501 manufactured by Toray-Dupont), 40 weight % of vinylidene chloride-methylacrylate copolymer resin (94% vinylidene chloride content), and 2 weight % of epoxidized soybean oil to said copolymer resin.

The resin composition A was mixed nd melted using monoaxial extruder (cylinder diameter 40 mm, L/D=24) and prepared into pellet at 180° C. resin temperature. The pellet was pressed to make test pieces, 500 μm in its thickness, with desk press (AYSR 5, Shinto Metal Works) at 180° C. (50 kg/cm², 2 min.), then the test pieces were stretched 3.5 times in the direction of both length and breadth at 90° C. into 40 μm film with biaxial stretching.

EXAMPLE 2

A biaxially stretched film was produced in the same was as that employed in Example 1, except that resin composition was adopted for following resin composition K. The resin composition K was a blended resin consisting of 45 weight % of PIFG-40 as polyester resin, 15 weight % of HYTREL #2501 as polyester elastomer, 40 weight % of vinylidene chloride-methylacrylate copolymer resin (94 weight %, vinylidene chloride content), and 2 weight % of epoxidized soybean oil to said copolymer resin.

EXAMPLE 3

A biaxially stretched film was produced in the same way as that employed in Example 1, except that resin composition was adopted for following resin composition T. The resin composition T was a blended resin consisting of 50 weight % of PIFG-40 as polyester resin, 10 weight % of HYTREL #2501 as polyester elastomer, 40 weight % of vinylidene chloride-methylacrylate copolymer resin (94 weight %, vinylidene chloride content), and 2 weight % of epoxidized soybean oil to said copolymer resin.

EXAMPLE 4

A biaxially stretched film was produced in the same way as that employed in Example 1, except that resin composition was adopted for following resin composition. The resin composition was a blended resin consisting of 65 weight % of PIFG-40 as polyester resin, 13 weight of HYTREL #2501 as polyester elastomer, 22 weight % of vinylidene chloride-methylacrylate copolymer resin (94 weight %, vinylidene chloride content), and 2 weight % of epoxidized soybean oil to said copolymer resin.

COMPARATIVE EXAMPLE 1

A biaxially stretched film was produced in the same way as that employed in Example 1, except that resin composition was adopted for following resin composition S. The resin composition S was a blended resin consisting of 60 weight % of PIFG-40 as polyester resin, 40 weight % of vinylidene chloride-methylacrylate copolymer resin (94 weight %, vinylidene chloride content), and 2 weight % of epoxidized soybean oil to said copolymer resin.

COMPARATIVE EXAMPLE 2

A biaxially stretched film was produced in the same way as that employed in Example 1, except that resin composition was adopted for following resin composition. The resin composition was a blended resin consisting of 20 weight % of PIFG-40 as polyester resin, 40 weight % of HYTREL #2501 as polyester elastomer, 40 weight % of vinylidene chloride-methylacrylate copolymer resin (94 weight %, vinylidene chloride content), and 2 weight % of epoxidized soybean oil to said copolymer resin.

COMPARATIVE EXAMPLE 3

A non-stretched press sheet having 500 μm thickness was produced in the same way that employed in Example 3, except that the sheet was not biaxially stretched. Impact thrusting energy and oxygen gas transmission rate were measured in sheet of 500 μm thickness and converted to the value of thickness of 40 μm (impact thrusting energy) and 8 μm (oxygen gas transmission rate).

COMPARATIVE EXAMPLE 4

A biaxially stretched film was produced in the same way as that employed in obtained following the same Example 1, except that only polyester, PIFG-40 was used instead of resin composition.

COMPARATIVE EXAMPLE 5

A biaxially stretched film was produced in the same way as that employed in Example 1, except that vinylidene chloride-methylacrylate copolymer resin (94 weight %, vinylidene chloride content) and 2 weight % of epoxidizd soybean oil to said copolymer resin were used instead of resin composition.

Table 1 shows the data of heat shrinkage percentage, oxygen gas transmission rate (converted to 8 μm film thickness), and impact thrust energy of the film gained in Example 1~4 and Comparative Example 1~5. Table 4 shows the methods on measurement of the physical properties.

By this invention, excellent heat shrinkable film having good oxygen gas barrier property and cold resistance was obtained as clarified bu Example 1~4. In general, heat shrinkable film with single layer being applicable for practical use requires heat shrinkage percent of over 20% in the direction of both length and breadth, oxygen gas transmission rate of below 100 cc/m²·day·atm (converted to 8 μm, 30° C., 100%RH), and impact thrusting energy of over 80 mJ/40 μm. While, Comparative Example 1 shows inferior impact strength (expressed by impact thrust energy) because of no content on polyester elastomer, Comparative Example 2 shows inferior oxygen gas barrier property because of beyond the limits on the content of polyester and polyester elastomer, Comparative Example 3 shows poor oxygen gas barrier property because of non-stretched film, and each Comparative Example 4, 5 show poor oxygen gas barrier property and cold resistance because of sole polyester and PVDC film respectively.

ene (DFDAI137, manufactured by Nippon Unicar Co., Ltd. melt index =1.0, density =0.906 g/cm³) and EVA including 7.5 weight % of vinylacetate content (NUC #8425 manufactured by Nippon Unicar Co., Ltd., melt index =2.3, density =0.93 g/cm³) with blending ratio 70:30 respectively.

③Resin composition B was used as inner layer.

④Resin C, low density polyethylene resin (F277-1 manufactured by Sumitomo Chemical Co., Ltd., melt index =2.0, density =0.924 g/cm³) was used as sealing layer.

⑤Resin D, ethylene-ethylacrylate copolymer resin containing 15 weight % of ethylacrylate (DPDJ#6182, manufactured by Japan Unicar Company, melt index =1.5, density =0.93 g/cm³) was used as adhesive layer.

These resins A, B, B, C, D, were extruded separately with each 5 extruders, introduced with melted condition into circular die of coextruder, and coextruded to 7 layers construction shown in Table 2. The resin temperature of melted tubular film was 190° C. at die outlet portion. Said melted tubular film was quenched by showering with water at 10°~30° C. and changed into flat tubular film having 150 mm in flat width and 510 μm in its thickness.

The thus obtained flat tubular film was irradiated with 10 Mega rad in electron irradiation equipment having 400 KeV of accelerating voltage. Next, the film was passed through hot water bath at 80°~95° C. and hot wind cylinder at 110° C. and stretched each 3 times in the direction of both length and breadth with inflation method under cooling by air at 20° C. The biaxially stretched film obtained was about 450 mm in its width and about 57 μm in its thickness.

EXAMPLE 6

A biaxially stretched film was produced in the same way as that employed in Example 5 except that resin E which is EVA containing 7.5 weight % of vinylacetate content (DPDJ #8425, manufactured by Nippon Unicar Co., Ltd.) was used as inner layer.

TABLE 1

| | Resin Composition | | | Heat shrinkage Percentage L/T % | Oxygen gas transmission rate (cc/m²·day·atm) | Impact thrusting energy 5° C. mJ/40 μm |
|---|---|---|---|---|---|---|
| | Polyester (%) | Polyester elastomer (%) | PVDC (%) | | | |
| Example 1 | 30 | 30 | 40 | 42/45 | 70 | 170 |
| Example 2 | 45 | 15 | 40 | 45/45 | 65 | 150 |
| Example 3 | 50 | 10 | 40 | 45/45 | 60 | 130 |
| Example 4 | 65 | 13 | 22 | 43/43 | 80 | 140 |
| Comparative Example 1 | 60 | 0 | 40 | 44/45 | 55 | 22 |
| Comparative Example 2 | 20 | 40 | 40 | 45/45 | 120 | 260 |
| Comparative Example 3 | 50 | 10 | 40 | 0/0 | 230 | 130 |
| Comparative Example 4 | 100 | 0 | 0 | 30/25 | 410 | 30 |
| Comparative Example 5 | 0 | 0 | 100 | 46/45 | 8 | 10 |

EXAMPLE 5

①Resin composition A in Example 1 was used for the intermediate layer (oxygen gas barrier layer).

②Following resin composition B was used for outermost layer. The resin composition B was a blended resin consisting of each linear low density polyethyl-

EXAMPLE 7

A biaxially stretched film was produced in the same way as that employed in Example 5, except that resin E was used as outer layer and the temperature of hot wind in the hot wind cylinder was 95° C.

EXAMPLE 8

A biaxially stretched film was produced in the same way as that employed in Example 5, except that resin F which is a ethylene-methylmethacrylate copolymer resin containing 12.0 weight % of methylmethacrylate content (Nucrel N1202, manufactured by Du Pont-Mitsui Co.) with adding 1000 ppm of nonionic antistatic agent (ELEGAN S-100, manufactured by Japan Oil Fats and Co., Ltd.) was used as outer and inner layers and the temperature of hot wind in the hot wind cylinder was 95° C.

EXAMPLE 9

A biaxially stretched film was produced in the same way as that employed in Example 5, except that resin G which is a ethylene-acrylic acid copolymer resin containing 6 weight % of acrylic acid content (Escore #TR5001, manufactured by Exxon Company, melt index =2.0, density =0.93 g/cm$^3$, melting point =102° C.) with adding 1000 ppm of nonionic antistatic agent (ELEGAN S-100, manufactured by Japan Oil and Fats Co., Ltd.) was used as outer and inner layers and the temperature of hot wind in the hot wind cylinder was 95° C.

EXAMPLE 10

A biaxially stretched film was produced in the same way as that employed in Example 5, except that resin H which is a copolymer nylon 6 12 (CM6541X3, manufactured by Toray Industries Inc., density =1.06, melting point =130° C.) was used as outer layer and resin I which is an acid grafted EVA (E-100H, manufactured by Mitsubishi Petrochemical Co., Ltd., melt index =2.3, density =0.94, melting point =93° C.) was used as adhesive layer.

EXAMPLE 11

A biaxially stretched film was produced in the same way as that employed in Example 5, except that resin J which is a linear low density polyethylene (UZ1030L, manufactured by Mitsui Petrochemical Industries, Ltd., elt index =3.0, melting point =120° C., density =0.910) was used as sealing layer.

EXAMPLE 12

A biaxially stretched film was produced in the same way as that employed in Example 5, except that resin K described in Example 2 was used as oxygen gas barrier layer.

EXAMPLE 13

A biaxially stretched film was produced in the same way as that employed in Example 5, except that resin L which is a ethylene-1,4-diene copolymer resin (ROP2D, manufactured by Mitsubishi Petrochemical Co., Ltd., melt index =2.6, density =0.923 g/cm$^3$) was used as outer layer and the irradiation dose was changed to 6 Mega rad.

EXAMPLE 14

A biaxially stretched film was produced in the same way as that employed in Example 5, except that following resin Q was used as an oxygen gas barrier layer. The resin Q is a blended resin consisting of 30 weight % of terephthalic acid-ethylene glycol-1,4-cyclohexane dimethanol copolymer (Kodar PETG, manufactured by Eastman Kodak Co.) as polyester resin, 30 weight % of HYTREL #2501 as polyester elastomer, 40 weight % of vinylidene chloride-methylacrylate copolymer resin (94 weight %, vinylidene chloride content), and 2 weight % of epoxidized soybean oil to said copolymer resin.

Construction of film layers and test results on physical properties obtained in Example 5~14 are shown in Table 2.

COMPARATIVE EXAMPLE 6

A biaxially stretched film was produced in the same way as that employed in Example 5, except that following resin M was used as oxygen gas barrier layer. The resin M is a blended resin consisting of 80 weight % of PIFG-40 as polyester resin, 15 weight % of HYTREL #2501 as polyester elastomer, 5 weight % of vinylidene chloride-methylacrylate copolymer resin (94 weight %, vinylidene chloride content), and 2 weight % of epoxidized soybean oil to said copolymer resin.

COMPARATIVE EXAMPLE 7

A biaxially stretched film was produced in the same way as that employed in Example 5, except that following resin N was used as oxygen gas barrier layer. The resin N is a blended resin consisting of 30 weight % of PIFG-40 as polyester resin, 10 weight % of HYTREL #2501 as polyester elastomer, 60 weight % of vinylidene chloride-methylacrylate copolymer resin (94 weight %, vinylidene chloride content), and 2 weight % of epoxidized soybean oil to said copolymer resin.

COMPARATIVE EXAMPLE 8

A biaxially stretched film was produced in the same way as that employed in Example 5, except that resin O was used as oxygen gas barrier layer. The resin O is a blended resin consisting of 60 weight % of Kodar PETG as polyester resin, 40 weight % of vinylidene chloride-methylacrylate copolymer resin (94 weight %, vinylidene chloride content), and 2 weight % of epoxidized soybean oil to said copolymer resin.

COMPARATIVE EXAMPLE 9

A biaxially stretched film was produced in the same way as that employed in Example 5, except that resin S described in Comparative Example 1 was used as oxygen gas barrier layer.

COMPARATIVE EXAMPLE 10

A biaxially stretched film was produced in the same way as that employed in Example 5, except that resin P was used as oxygen gas barrier layer. The resin P is a blended resin consisting of 60 weight % of HYTREL #2501 as polyester elastomer, 40 weight % of vinylidene chloride-methylacrylate copolymer resin (94 weight %, vinylidene chloride content), and 2 weight % of epoxidized soybean oil to said copolymer resin.

COMPARATIVE EXAMPLE 11

A biaxially stretched film was produced in the same way as that employed in Example 5, except that resin R which dispersed 2 weight % of epoxidized soybean oil into vinylidene chloride-methylacrylate copolymer resin (94 weight %, vinylidene chloride content) as oxygen gas barrier layer, was used.

COMPARATIVE EXAMPLE 12

Film constitution was the same constitution as that employed in Example 5 and the sample was prepared by stretching without electron beam irradiation. The stretching was carried out to pass through hot water bath at 80°~85° C. and hot wind cylinder at 100° C., then the 2.3 times stretching was done in both direction of length and breadth respectively with inflation method while cooling by air at 20° C. The obtained biaxial stretching film shows 345 mm in its flat width and 96 μm in its thickness.

Further, the inflation method which was the same stretching condition (hot water bath: 80°~95° C., 110° C. in wind cylinder) of Example 5, could not apply for this sample.

Constitution of film layers and measured results on physical properties obtained in Comparative Example 6~12 was shown in Table 3.

Table 4 shows the method to determine the physical properties. In this Table, the value of gel % in polyolefin layer was determined on the polyolefin layer separated from biaxially stretched film.

According to this invention, laminated film having various excellent properties on heat resistance sealing property, melt hole resistance, cold resistance, and transparency was obtained as shown apparently in Example 5~14.

The laminated film being fitted to the object of this invention should show below 1 of damage number in melt hole resistance, in cold resistance, over 15% in heat shrinkage percentage, below 8% in haze, below 200 cc/m$^2$·day·atm in oxygen gas transmission rate, over B in colouring, over 1.8 kg/15 mm in sealing strength, and no-cutting in melting at the sealing portion.

In Comparative Example 6, sufficient oxygen gas barrier property was not obtained because of too small weight ratio of PVDC in intermediate layer.

In Comparative Example 7, weight ratio of PVDC in intermediate layer is too large, so PVDC becomes matrix which cause colouring by decomposition under electron beam irradiation and shows also poor cold resistance.

In Comparative Example 8, suitable amount of polyester elastomer was not contained in intermediate layer, so the improvement on cold resistance could not be attained. And intermediate layer shows colouring with decomposition at coextruding.

In Comparative Example 9, since suitable polyester elastomer was not contained in intermediate layer, the improvement on cold resistance could not be attained.

In Comparative Example 10, intermediate layer was 2 components compatible system consisting of PVDC and polyester elastomer, so oxygen gas barrier property was greatly deteriorated.

In Comparative Example 11, intermediate layer contains only vinylidene chloride polymer, so cold resistance became low and strong colouring was shown by the decomposition under electron beam irradiation.

In Comparative Example 12, as stretching process was carried out without electron beam irradiation, film production was failed to stretch the film by ordinary stretching ratio and inferior sealing strength, cutting of sealing by melting, and melt hole resistance were observed even low stretching ratio due to the lack of crosslinking. Further, since the stretching temperature can not be raised enough, after heat shrinking, the shrinkage of intermediate layer was not sufficient. Therefore the intermediate layer became to wrinkle and the transparency of laminated film was inferior.

TABLE 2

| Example | Construction of laminated film | | | | | | | Irradiation (Mrad) | Property of laminated film | |
|---|---|---|---|---|---|---|---|---|---|---|
| | Seal layer (μm) | Adhesive layer (μm) | Inner layer (μm) | Adhesive layer (μm) | Intermediate layer (μm) | Adhesive layer (μm) | Outer layer (μm) | | Melt hole resistance[*1] | Cold resistance |
| 5 | C (13) | D (1) | B (20) | D (1) | A (8) | D (1) | B (13) | 10 | 0 | ○ |
| 6 | C (13) | D (1) | E (20) | D (1) | A (8) | D (1) | B (13) | 10 | 0 | ○ |
| 7 | C (13) | D (1) | E (20) | D (1) | A (8) | D (1) | E (13) | 10 | 0 | ○ |
| 8 | C (13) | D (1) | F (20) | D (1) | A (8) | D (1) | F (13) | 10 | 0 | ○ |
| 9 | C (13) | D (1) | G (20) | D (1) | A (8) | D (1) | G (13) | 10 | 0 | ○ |
| 10 | C (13) | I (1) | B (20) | I (1) | A (8) | I (1) | H (13) | 10 | 0 | ○ |
| 11 | J (13) | D (1) | B (20) | D (1) | A (8) | D (1) | B (13) | 10 | 0 | ○ |
| 12 | C (13) | D (1) | B (20) | D (1) | K (8) | D (1) | B (13) | 10 | 0 | ○ |
| 13 | C (13) | D (1) | B (20) | D (1) | A (8) | D (1) | L (13) | 6 | 0 | ○ |
| 14 | C (13) | D (1) | B (20) | D (1) | Q (8) | D (1) | B (13) | 10 | 0 | ○ |

| Example | Property of laminated film | | | | Gel % of layers | | | Seal strength (kg/15 mm) | Seal cutting[*3] |
|---|---|---|---|---|---|---|---|---|---|
| | Heat shrinkage percentage L/T (%) | Haze (%) | Oxygen gas-transmission rate[*2] | Coloring | Outer layer (%) | Inner layer (%) | Seal layer (%) | | |
| 5 | 52/55 | 4.5 | 70 | A | 55 | 50 | 25 | 2.1 | ○ |
| 6 | 55/57 | 4.0 | 70 | A | 55 | 62 | 25 | 2.0 | ○ |
| 7 | 58/59 | 3.5 | 70 | A | 62 | 62 | 25 | 2.1 | ○ |

TABLE 2-continued

| | | | | | | | | | | |
|---|---|---|---|---|---|---|---|---|---|---|
| 8 | 58/60 | 3.5 | 70 | A | 65 | 60 | 25 | 2.3 | ○ |
| 9 | 55/56 | 4.0 | 70 | A | 50 | 45 | 25 | 2.2 | ○ |
| 10 | 50/47 | 3.5 | 65 | A | 20 | 50 | 25 | 2.1 | ○ |
| 11 | 53/56 | 3.0 | 70 | A | 55 | 50 | 20 | 2.4 | ○ |
| 12 | 55/56 | 3.5 | 65 | A | 55 | 50 | 25 | 2.0 | ○ |
| 13 | 53/55 | 3.5 | 70 | A | 65 | 40 | 10 | 2.0 | ○ |
| 14 | 53/55 | 4.0 | 80 | B | 55 | 50 | 25 | 2.2 | ○ |

[1] damage numbers in 5 sheets
[2] $cc/m^2 \cdot day \cdot atm$
[3] ○ ; no cutting in melt. X; cutting in melt.

TABLE 3

Comparative Example 6~12

| Comparative Example | Construction of laminated film | | | | | | | | Property of laminated film | |
|---|---|---|---|---|---|---|---|---|---|---|
| | Seal layer (μm) | Adhesive layer (μm) | Inner layer (μm) | Adhesive layer (μm) | Intermediate layer (μm) | Adhesive layer (μm) | Outer layer (μm) | Irradiation (Mrad) | Melt hole resistance[1] | Cold resistance |
| 6 | C (13) | D (1) | B (20) | D (1) | M (8) | D (1) | B (13) | 10 | 0 | ○ |
| 7 | C (13) | D (1) | B (20) | D (1) | N (8) | D (1) | B (13) | 10 | 0 | X |
| 8 | C (13) | D (1) | B (20) | D (1) | O (8) | D (1) | B (13) | 10 | 0 | X |
| 9 | C (13) | D (1) | B (20) | D (1) | S (8) | D (1) | F (13) | 10 | 0 | X |
| 10 | C (13) | D (1) | B (20) | D (1) | P (8) | D (1) | B (13) | 10 | 0 | ○ |
| 11 | C (13) | D (1) | B (20) | D (1) | R (8) | D (1) | B (13) | 10 | 0 | X |
| 12 | C (13) | D (1) | B (20) | D (1) | A (8) | D (1) | B (13) | 0 | 4 | ○ |

| Comparative Example | Property of laminated film | | | | Gel % of layers | | | Seal strength (kg/15 mm) | Seal cutting[3] |
|---|---|---|---|---|---|---|---|---|---|
| | Heat shrinkage percentage L/T (%) | Haze (%) | Oxygen gas-transmission rate[2] | Coloring | Outer layer (%) | Inner layer (%) | Seal layer (%) | | |
| 6 | 52/52 | 3.0 | 280 | A | 55 | 50 | 25 | 2.0 | ○ |
| 7 | 55/53 | 3.5 | 50 | C | 55 | 50 | 25 | 2.1 | ○ |
| 8 | 50/49 | 4.0 | 70 | C | 55 | 50 | 25 | 2.0 | ○ |
| 9 | 54/56 | 3.0 | 40 | A | 55 | 50 | 25 | 2.0 | ○ |
| 10 | 57/60 | 20 | 220 | A | 55 | 50 | 25 | 2.2 | ○ |
| 11 | 49/50 | 3.5 | 20 | C | 55 | 50 | 25 | 2.0 | ○ |
| 12 | 35/40 | 43 | 60 | A | 0 | 0 | 0 | 1.3 | X |

[1] damage numbers in 5 sheets
[2] $cc/m^2 \cdot day \cdot atm$
[3] ○ ; no cutting in melt. X; cutting in melt.

TABLE 4

| Item of test | Method of determination |
|---|---|
| Heat shrinking percentage | Measurement is carried out using 20 pieces of film with 10 cm × 10 cm, which is immersed into hot water for 10 second at 90° C. under free shrinking. Then shrinking is calculated against both original length and breadth and reported with average value. |
| Impact thrusting energy | Measurement is carried out using film with 40 μm in thickness, following ASTM-D3763 at 5° C. of ambient temperature with Impact Tester (Rheometrics Dropweight Tester # Model PDT-5000). |
| Melt hole resistance | A hole having an internal diameter of 20 mm and a depth of 20 mm is covered with a film which is pressed by a seal packing. After the hole has been evacuated to 10 Torr, the hole is immersed in hot water at 85° C. for 10 seconds. The number of the sheet pierced with hole when 5 sheets of film are subjected to this treatment is determined. |
| Oxygen gas transmission rate | Prior to the test, the film is left for 1 week in controlled room with 100% RH, at 30° C. The measurement is carried out with $^R$MOCON # OX-TRAN TWIN (coulometric detection) designated by ASTM D-3985-81, under 100% RH, at 30° C. |
| Gel fraction (%) | (1) Gel fraction, %, of polyolefin Sample, weight ($W_1$) is immersed for 2 hours into trichlorobenzene kept at 135° C., then unsolved substance is separated using 100 mesh stainless wire sieve. The residue is dryed in vacuum for 24 hours, at 40° C. and its weight ($W_2$) is measured and the fraction is calculated by following equation. Gel fraction (%) = ($W_2/W_1$) × 100 (2) Gel fraction, %, of polyamide Measurement is carried out by the same method in case of polyolefin, except immersion into metacresol kept at 70° C., for 2 hours. |
| Cold resistance | Measurement is carried out to determine the change of oxygen barrier property with pinhole, after abuse treatment based upon U.S. MIL-B-131 and FED. TEST METHOD STD No. 101C. The abuse treatment is done by GELVO FLEX TEST with tubular film having 90 mm in diameter and 200 mm in |

TABLE 4-continued

| Item of test | Method of determination |
| --- | --- |
| | length. A thousand times of a series of crushing, bending, and rotating are added to tubular film with 40 (cycles/min) and 440° C. (arc) under ambient temperature of −10° C. Then, oxygen gas transmission rate is evaluated on the opened tubular film with rating ○ for no change before and after the abuse and rating X for deterioration of more than 400 cc/m² · day · atm. |
| Haze (%) | Measurement is carried out for the laminated film with 10 cm × 10 cm to shrink freely for 1 minute in hot water at 90° C. and haze (%) is determined with Haze Meter, type MDHΣ 80 manufactured by Nihon Denshoku Kogyo K.K. |
| Colouring on laminated film (Colouring) | Measurement is carried out with 3 rating, after laminated film 10 cm × 10 cm is immersed and shrunken freely for 1 minute in boiling water.<br>A Colouring is not visually observed.<br>B Slight colouring, but no problem for practical use.<br>C Extensive colouring, can not be used practically. |
| Seal strength | Measurement is carried out with cutting the film into long strip with 15 mm width to meet at right angle to seal line, opening said strip, setting to the chuck of tensile tester placing seal line center, drawing with 200 mm/min., reading the tenacity at the cutting seal line. |
| Cutting by melting | Measurement is carried out with using vacuum chamber (# Vc 999), raising the temperature at sealing with hitting 20 times using impulse seal (2.5 graduation) and attaining equilibrium (210° C., peak temperature), executing sealing on the film, and evaluating the cutting by melting. Cutting by melting means being cut at seal line, even in a portion. |

What is claimed is:

1. A resin composition comprising:
    26–70% by weight of a thermoplastic polyester resin which is composed of a mixed dibasic acid component comprising terephthalic acid and isophthalic acid, and a mixed dialcohol component comprising ethylene glycol and diethylene glycol;
    10–30% by weight of a polyester elastomer which is composed of a mixed dibasic acid component comprising terephthalic acid and isophthalic acid, and a mixed dialcohol component comprising 1,4-butanediol and polytetramethylene glycol; and
    20–44% by weight of a vinylidene chloride resin, the thermoplastic polyester resin not being compatible with the vinylidene chloride resin.

2. A biaxially stretched heat shrinkable film having oxygen gas barrier properties comprising:
    26–70% by weight of a thermoplastic polyester resin which is composed of a mixed dibasic acid component comprising terephthalic acid and isophthalic acid, and a mixed dialcohol component comprising ethylene glycol and diethylene glycol;
    10–30% by weight of a polyester elastomer which is composed of a mixed dibasic acid component comprising terephthalic acid and isophthalic acid, and a mixed dialcohol component comprising 1,4-butanediol and polytetramethylene glycol; and
    20–44% by weight of a vinylidene chloride resin, the thermoplastic polyester resin not being compatible with the vinylidene chloride resin.

* * * * *